United States Patent
Hammarqvist (10) Patent No.: US 10,270,703 B2
(45) Date of Patent: Apr. 23, 2019

(54) MEDIA BUFFERING

(71) Applicant: Microsoft Technology Licensing, LLC, Redmond, WA (US)

(72) Inventor: Ulf Nils Evert Hammarqvist, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 15/334,024

(22) Filed: Oct. 25, 2016

(65) Prior Publication Data

US 2018/0063008 A1    Mar. 1, 2018

(30) Foreign Application Priority Data

Aug. 23, 2016   (GB) .................................. 1614356.2

(51) Int. Cl.
| | |
|---|---|
| *H04L 12/835* | (2013.01) |
| *H04L 12/26* | (2006.01) |
| *H04L 12/823* | (2013.01) |
| *H04L 12/811* | (2013.01) |
| *H04L 12/875* | (2013.01) |
| *H04L 12/841* | (2013.01) |

(52) U.S. Cl.
CPC ............ *H04L 47/30* (2013.01); *H04L 43/087* (2013.01); *H04L 43/0882* (2013.01); *H04L 47/283* (2013.01); *H04L 47/32* (2013.01); *H04L 47/38* (2013.01); *H04L 47/56* (2013.01)

(58) Field of Classification Search
CPC ... H04L 47/30; H04L 43/087; H04L 43/0882; H04L 47/32; H04L 47/38; H04L 47/56; H04L 47/283
See application file for complete search history.

(56) References Cited

U.S. PATENT DOCUMENTS

| | | |
|---|---|---|
| 5,565,924 A | 10/1996 | Haskell et al. |
| 6,170,075 B1 | 1/2001 | Schuster et al. |
| 6,757,256 B1 | 6/2004 | Anandakumar et al. |
| 6,980,569 B1 | 12/2005 | Beyda et al. |

(Continued)

FOREIGN PATENT DOCUMENTS

| | | |
|---|---|---|
| EP | 2770504 A2 | 8/2014 |
| GB | 2356537 A | 5/2001 |

OTHER PUBLICATIONS

"International Search Report and Written Opinion Issued in PCT Application No. PCT/US2017/047238", dated Nov. 6, 2017, 10 Pages.

(Continued)

*Primary Examiner* — Eric Myers
(74) *Attorney, Agent, or Firm* — Klarquist Sparkman, LLP (57) ABSTRACT

A transmitting device comprising a transmit buffer for buffering a plurality of packets representing a live media stream, the packets having an order in the media stream from oldest to most recent. The transmitting device further comprising a transmitter for transmitting the packets from the buffer live over a network; and a controller arranged to measure an amount of data buffered for transmission in the transmit buffer, and to drop or compress the oldest packet or a predetermined number of the oldest packets on condition that the amount of data buffered for transmission exceeds or is likely to exceed a predetermined threshold.

19 Claims, 4 Drawing Sheets

(56) References Cited

U.S. PATENT DOCUMENTS

| | | | |
|---|---|---|---|
| 7,047,201 | B2 | 5/2006 | Chang |
| 7,346,005 | B1 | 3/2008 | Dowdal |
| 7,596,488 | B2 | 9/2009 | Florencio et al. |
| 7,787,447 | B1 | 8/2010 | Egan et al. |
| 7,944,823 | B1 | 5/2011 | Bordonaro et al. |
| 8,099,755 | B2 | 1/2012 | Bajpai et al. |
| 8,279,884 | B1 | 10/2012 | Narasimha et al. |
| 8,451,723 | B2 | 5/2013 | Pearson |
| 8,548,048 | B2 | 10/2013 | El-Maleh et al. |
| 8,611,337 | B2 | 12/2013 | Yadav |
| 8,855,145 | B2 | 10/2014 | Vafin et al. |
| 9,020,039 | B2 | 4/2015 | van der Schaar |
| 9,177,570 | B2 | 11/2015 | Fex et al. |
| 9,179,154 | B2 | 11/2015 | Shimizu et al. |
| 9,461,900 | B2 | 10/2016 | Kim et al. |
| 9,860,605 | B2 | 1/2018 | Izvorski et al. |
| 2001/0023454 | A1 | 9/2001 | Fitzgerald |
| 2003/0110233 | A1 | 6/2003 | Prall |
| 2005/0058145 | A1 | 3/2005 | Florencio et al. |
| 2007/0009027 | A1 | 1/2007 | Zhu et al. |
| 2008/0025392 | A1 | 1/2008 | Lee et al. |
| 2009/0103609 | A1 | 4/2009 | Jiang et al. |
| 2013/0223515 | A1 | 8/2013 | Shetty et al. |
| 2014/0310008 | A1* | 10/2014 | Kang .................... G10L 19/00 704/500 |
| 2014/0337473 | A1 | 11/2014 | Frusina et al. |
| 2015/0036695 | A1 | 2/2015 | Gowda et al. |
| 2015/0172668 | A1 | 6/2015 | Annamraju et al. |
| 2015/0350099 | A1 | 12/2015 | Sun et al. |
| 2018/0063008 | A1 | 3/2018 | Hammarqvist |
| 2018/0063011 | A1 | 3/2018 | Hammarqvist et al. |

OTHER PUBLICATIONS

"Quality of Service for Voice over IP", In White Paper of CISCO, Sep. 9, 2014, pp. 1-44.

Parikh, et al., "Methods for Mitigating IP Network Packet Loss in Real Time Audio Streaming Applications", In SMPTE Motion Imaging Journal, vol. 123, Issue 5, Jul. 2014, 6 pages.

Lu, et al., "Low Complexity Packet Loss Recovery Method for Audio Transmission", In Proceedings of the 2nd International Conference on Computer Science and Electronics Engineering, Mar. 22, 2013, pp. 1526-1529.

"International Search Report and Written Opinion", Application No. PCT/US2017/047251, dated Jan. 29, 2018, 10 pages.

"Non-Final Office Action", U.S. Appl. No. 15/338,955, dated Mar. 12, 2018, 8 pages.

"VoiceData", Retrieved From: https://mumble-protocol.readthedocs.io/en/latest/voice_data.html, Jan. 11, 2015, 8 Pages.

"Final Office Action Issued in U.S. Appl. No. 15/338,955", dated Sep. 21, 2018, 18 Pages.

* cited by examiner

MEDIA BUFFERING

PRIORITY

This application claims priority under 35 USC 119 or 365 to Great Britain Application No. 1614356.2 filed Aug. 23, 2016, the disclosure of which is hereby incorporated by reference in its entirety.

BACKGROUND

Communications networks are being increasingly used for real-time communications such as voice and video communication. In such fields it becomes more important that the data transmitted, making up the content of such communications, arrives at the correct time within the communication data sequence, e.g. within the conversation sequence. Some communications networks and transport networks are designed to value error free delivery of data over timely delivery of data, whereas other networks prioritize timely delivery of data above error free delivery of data. When communications are sent using protocols designed to prioritize timely delivery of data, it can often be difficult for the receiving terminal of the communication data to assess whether data packets are arriving late within the sequence due to delays at the transmitter, or due to delays in the network itself. To account for these delays many receivers possess a buffer, referred to as a jitter buffer, for storing received data packets before further processing the content of these packets into an audible communication for playout. This allows the receiver to wait some amount of time in the hope of receiving the delayed data before the data being played out reaches the point in the sequence where it requires the audio data yet to be received.

Some jitter buffers are configured with an adaptive mechanism whereby, when the receiver receives a packet which it perceives as being delayed, the length of the jitter buffer is increased, to allow more time for the delayed packet to be received. However, this results in artificial pauses in the audible communication, and can result in the parties of the communication perceiving this delay, for example resulting in the parties talking over each other. The receiver may eventually determine that a packet will not be received in time and the missing packet is then concealed.

SUMMARY

It is recognized herein that at the transmitting side of the communication will often be possible that an assessment can be made as to whether data to be transmitted is already delayed prior to transmission. This can be due to some internal processing delay, for example a CPU or thread stall. Having made such an assessment, audio data frames or packets can be dropped or compressed before transmission so as to eliminate the already apparent delay. By altering the data to be transmitted as part of the communication in this way it is possible to cause the receiver to perceive dropped packets instead of delayed packets. A receiver will generally not extend its jitter buffer in response to detecting a dropped packet. This is because in networks where timely arrival of data is valued over error free data the loss is accepted, and the dropped information is not resent. Thus there is no reason to wait for the dropped packet to arrive. By taking a local measure at the transmit buffer of the amount of data queued for transmission it can be determined that a delay has already occurred, and steps can be taken to drop or compress the oldest buffered data. This results in the following data being received 'on time' by the receiver, preventing the extension of any jitter buffer, and minimizing any artificially introduced delay in the communication.

Various embodiments provide a transmitting device comprising a transmit buffer, a transmitted, and a controller. The transmit buffer is configured to buffer a plurality of packets representing a live media stream. The packets have an order within the media stream from oldest to most recent. The transmitter is configured to transmit the packets from the buffer live over a network. The controller is configured to measure the amount of data buffered for transmission in the transmit buffer. On condition that the measured amount exceeds, or is likely to exceed, a predetermined threshold the controller is further configured to drop or compress the oldest or a predetermined number of the oldest packets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present invention and to show how the same may be put into effect, reference will now be made, by way of example, to the following drawings in which.

DETAILED DESCRIPTION

In the following description, numerous specific details are set forth to provide a more thorough understanding of the described embodiments. However, it will be apparent to one of skill in the art that the described embodiments may be practiced without one or more of these specific details. In other instances, well-known features have not been described in order to avoid obscuring the described embodiments.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

Each data packet includes a header portion and a payload portion. The header portion of the data packet contains data for transmitting and processing the data packet. This information may include an identification number and source address that uniquely identifies the packet, a header checksum used to detect processing errors and the destination address. The header may also include a timestamp signifying the time of creation of the data in the payload as well as a sequence number signifying the position in the sequence of data packets created where that particular packet belongs. The payload portion of the data packet includes information from the digital signal intended for transmission. This information may be included in the payload as encoded frames such as voice or audio frames, wherein each frame represents a portion of the analogue signal. Typically, each frame comprises a portion of the analogue signal measuring 20 milliseconds in length. However, this should be understood to be a design choice of the system being used and thus can be any chosen division of the analogue signal either longer and/or shorter than 20 milliseconds.

Degradations in the channel on which the information is sent will affect the information received at the receiver. Degradations in the channel can cause changes in the packet sequence, delay the arrival of some packets at the receiver and cause the loss or dropping of other packets. The degradations may be caused by channel imperfections, noise and overload in the channel. Degradations in the communication experience can also be caused by delay is transmission of data packets at the transmitter. This is particularly likely when receivers are designed to adapt dynamically to perceived delays in the received data packets. Not all the receivers can determine whether the measured delay in the arrival of a packet at the receive side is due to degradation in the channel due to the network or a delay in sending the data at the transmitter side. Some network protocols are able to provide side information to inform the receiver of what kind of delay is occurring, and some receivers are configured to take action in response to this side information. However not all network protocols, especially those used for real-time communications, are able to include this information. Furthermore, not all receivers are capable of using this information even if provided. When the receiver cannot determine the nature of the delay from side information the solution is to treat all delays as though they are caused by the network. That is to respond by adjusting the buffer length at the receiver which stores all incoming data packets prior to unpacking and further processing. This buffer is commonly referred to as a jitter buffer.

A jitter buffer is used by a receiving terminal in a network to provide a waiting period over which delayed data packets can be received. This allows the receiving terminal to play out the received data packets to the receive side user in the correct order and at the correct time and/or sequence relative to each other. The jitter buffer thus prevents the audio signal played out at the receive side from being artificially compressed or broken up depending on the time of arrival of the data packets at the receiving terminal. When a delay is detected the receiver can extend the length of its jitter buffer to give the delayed packet more time to arrive in time to be placed correctly in the sequence of audio data before being played out. However, this can result in more artificial delay being introduced into the audio signal while awaiting the delayed data packet, and the result may be a noticeable overlap and mismatch in the conversation of the two-way communication session. Such adjustment of the jitter buffer in response to a processing type delay at the transmit side, which is likely to be temporary and at irregular intervals, is not desirable in a real-time communication scenario. This is because jitter buffers are designed to account for more constant and slowly attenuating changes in delay due to network conditions and as such can be slow to re-adjust back to a shorted length when possible. It would therefore be preferable to avoid the extension of the jitter buffer in response to any short term delays in packet transmission, e.g. due to CPU stalls and/or thread stalls.

CPU stalls and thread stalls occur when a process running on the CPU stops or is stopped. Some processors operate what is known as multithreading or multithreaded processing. In this type of processing the CPU or a single core of a multi-core processor can execute multiple processes or threads concurrently. The term process can also be used as an umbrella term to describe a whole process comprising multiple threads. For example, a communication client executing on the OS may require the CPU to execute the process of carrying out a call, but this may comprise multiple threads including for example the capturing of raw audio data via the microphone, as well as processing that data through to a network interface with a destination address etc. In multithreading each thread that runs concurrently on the CPU or core shares the resources of that core or CPU. A thread may run on the CPU when it is considered ready to run, and share the resources with any other thread which is also ready to run. However, a thread may stall in its execution of its task, i.e. by experiencing a cache miss. In this case another thread may use the available resources to continue in its task and the CPU performs overall in a more efficient way. This is because the threads that are executed simultaneously will utilize any unused resource due to the stalling of another thread. These threads may also be given priorities, and when CPU resources might be needed elsewhere one of the threads running may be dropped before or in preference to another of the threads running. This depends on the task the thread carries out and the programmed priority of that task to the whole process being carried out. For example, during the process of carrying out a voice call there may exist a thread being executed responsible for capturing the raw analogue audio data from the microphone, and a thread responsible for packetizing that data for application, transport, and/or network layer processes. During a real-time call the capture of the live media stream data performed in the first thread will be prioritized over the further processing of this data in the second thread. This is because the contemporaneous nature of the audio data and its sensitivity to intermittent error when it comes to comprehension require there to be as few gaps in its capture as possible. Whereas the further processing may be able to account for small delays in the transmission of packets due to stalls in a number of ways. Thus if the CPU should require resources to be freed up for a further third process, the lowest priority thread of the first and second thread might be allowed to stall in preference to the other. In this case the second thread of processing the captured audio data would be allowed to stall, but the microphone would continue to capture the audio data via the first thread.

One type of communication network suitable for transmitting digital information is the internet. Protocols which are used to carry voice signals over an Internet Protocol network are commonly referred to as Voice over IP (VoIP). VoIP is the routing of voice conversations over the Internet or through any other IP-based network.

Real-time Transport Protocol (RTP) is a protocol which provides end-to-end network transport functions suitable for applications transmitting real-time data, such as audio, video or simulation data, over multicast or unicast network services. RTP does not address resource reservation and does not guarantee quality-of-service for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers. RTP supports the use of sequence numbers and timestamps. The sequence number increments by one for each RTP data packet sent, and may be used by the receiver to detect packet loss and to restore packet sequence. The timestamp reflects the sampling instant of the first octet in the RTP data packet. The sampling instant must be derived from a clock that increments monotonically and linearly in time to allow synchronization and jitter calculations. Some underlying protocols (i.e. some network protocols), may require an encapsulation of the RTP packet to be defined. Typically, one packet of the underlying protocol contains a single RTP packet, but several RTP packets may be contained if permitted by the encapsulation method.

The inventor has noticed that at the transmitter side it is possible to know in advance when the amount of data buffered in the transmit buffer had reached an amount such that it would cause the queued buffered data to be received by the receiver with a delay. With prior knowledge at the transmit side before the data packets are transmitted there is thus provided an opportunity to correct the delay before the packets are transmitted and the receiver detects the delay. This can be done by either dropping or compressing the oldest packets or a predetermined number of the oldest packets. The oldest packet(s) being those having spent the most time waiting to be sent from within the transmit buffer. These are then the packets with the greatest potential of being received with delay. The oldest packet(s) may be dropped all together from the front of the buffer queue. Any number of packets may be dropped until the expected delay is either reduced to within an acceptable margin, or until the expected delay is zero. In the case of compressing the oldest packets this may involve compressing the data within the oldest packets so as to fit into fewer packets. The smaller number of packets containing the compressed data subsequently taking less time to transmit, and thus the information contained within their payloads appearing to the receiver to have arrived on time for playing out. The compression may involve decoding and re-encoding of audio data having previously been already packetized for transmission. In this way it is possible to trick the receiver into seeing loss instead of delay. The transmitter will thus skip a few packets instead of sending them so as to avoid a buildup of packets at the receiver side. That is to say if the buffered amount of data exceeds the predetermined threshold a number of the oldest packets in the buffer are dropped or compressed together.

Said in another way, if x packets are buffered at the buffer, n packets may be dropped, and x-n packets would be transmitted accordingly.

In some embodiments, if the transmitter determines that stalls are happening at regular intervals then the transmitter may not instigate the dropping or compressing of the oldest packets in the transmit buffer. In this regular stall case the delay could be modelled as a network delay due to its constant nature, and the jitter buffer of the receive side would likely adequately account for this. Temporary, irregularly occurring stalls or spikes in delay are however more difficult to account for. This is because some jitter buffers are slow at adapting back to a smaller size. Usually artifacts occur like speeding up, slowing down, or delay of a transmission, as well as corresponding concealment within the transmission. The corresponding adaptation of the jitter buffer can instigate some of these artifacts. By dropping or compressing together packets artifacts like delay and slowing down can be minimized if not removed because the packets the receiver does receive are on time.

Figure 1:
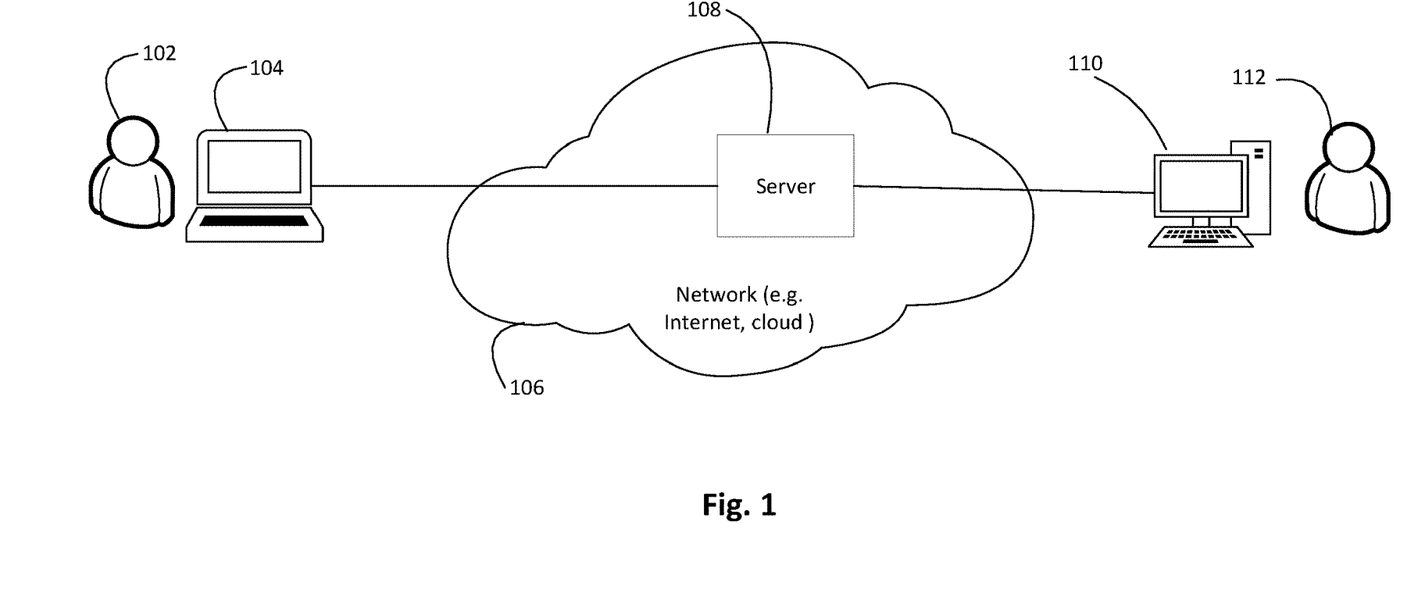
FIG. 1 shows a schematic illustration of a communication network comprising multiple services each with a respective user network of multiple users and user terminals.

FIG. 1 shows a communication system comprising a user 102 (e.g. the near end user of the system), a user terminal 104 (e.g. a laptop device etc.), a network 106 (e.g. the Internet, the cloud, or any other network through which communication messages and digital data may be sent), a server 108, and a further user of a further user terminal 110 (e.g. the receiving terminal of the communication event).

Near end user, user A, is the user of user terminal 104. User terminal 104 is connected to network 106. The connection is such that it enables communication (e.g. audio or video or some other such communication type), via network 106. Server 108 is a server of the network 106 and may be distributed throughout the network, in one or more physical locations, and as software, hardware, or any combination thereof.

The source terminal 104 is arranged to transmit data to the further user terminal 110 via the communication network 106. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data. Embodiments of the invention are particularly suited to asynchronous communication networks.

It should be appreciated that even though the exemplifying communications system shown and described in more detail herein stipulates a transmitting terminal and a receiving terminal, each of these terminals can also perform the reciprocal actions so as to provide a two-way communication link.

Figure 2:
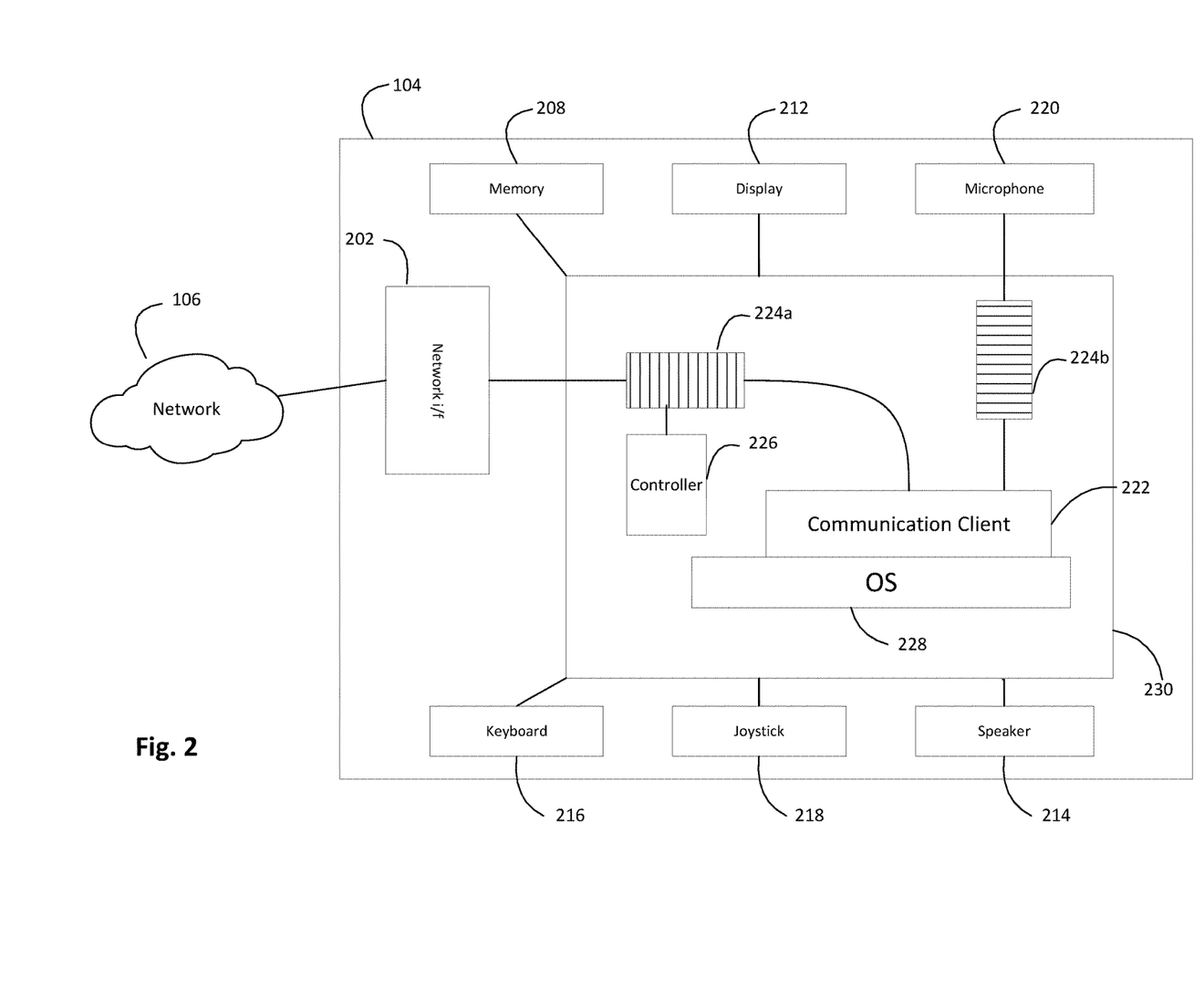
FIG. 2 shows a schematic block diagram of a user terminal.

FIG. 2 shows a schematic of a user terminal 104. User terminal 104 comprises a central processing unit, CPU, or processing module 230, the CPU 230 runs the processes required to operate the user terminal and includes the operating system, OS 228. The OS may be of any type, for example Windows™, Mac OS™ or Linux™. The CPU is connected to a variety of input and output components including a display 212, a speaker 214, a keyboard 216, a joystick 218, and a microphone 220. A memory component 208 for storing data is connected to the CPU. A network interface 202 is also connected to the CPU, such as a modem for communication with the network 106. If the connection of the user terminal 204 to the network 106 via the network interface 202 is a wireless connection, then the network interface 202 may include an antenna for wirelessly transmitting signals to the network 106 and wirelessly receiving signals from the network 106. Any other input/output device capable of providing data or extracting data from terminal 104 may also be connected to the CPU. The above mentioned input/output components may be incorporated into the user terminal 104 to form part of the terminal itself, or may be external to the user terminal 104 and connected to the CPU 230 via respective interfaces. The user terminal further comprises buffers 224a and 224b. The buffers are shown in FIG. 2 as software elements running as part of the processor, however they could also be hardware elements separate from the central processor and connected thereto. The buffers 224 are shown as separate from the operating system (OS), however in alternative configurations they could run on the OS. The buffers of FIG. 2 are shown as separate entities to the communication client running on the OS, however in other configurations the buffers may form part of the communication client itself and thus run on the OS within the client. Both buffers are buffers on which data can be stored after being received from one component of the user terminal and before being relayed to another component of the user terminal 104. Buffer 224b is a microphone buffer connected to the microphone 220 and configured to store the audio data captured by the microphone before being further processed. Buffer 224a is a transmit buffer where data, having been formed into data packets for transport, awaits being passed on to the network interface 202 where it is formed into network layer packets such as IP packets. Controller 226 connects to the buffers 224, and is configured to measure the amount of data stored or buffered in the buffers 224 at any one time. The controller may be connected to one or a plurality of buffers and measure the buffered data in any number of these at any time. As such the controller is able to determine and instigate, i.e. through connections to the CPU 230 (not shown in FIG. 2), the need for any possible further processes to be carried out in dependence on the measured amount of data in the buffers 224.

The OS 228 is executed on the CPU 230, where it manages the hardware resources of the computer, and handles data being transmitted to and from the network 106 via the network interface 202. Running on top of the OS 228 is the communication client software 222. The communication client 222 handles the application layer data and serves to formulate the necessary processes required to carry out the communication event. For example, the communication client 222 can be arranged to receive input data from the microphone 220 for converting into audio frames for further transport and transmission purposes. The communication client 222 may also supply the necessary information for addressing data packets so that they reach their intended recipient at the receiving further user terminal 110.

Figure 3:
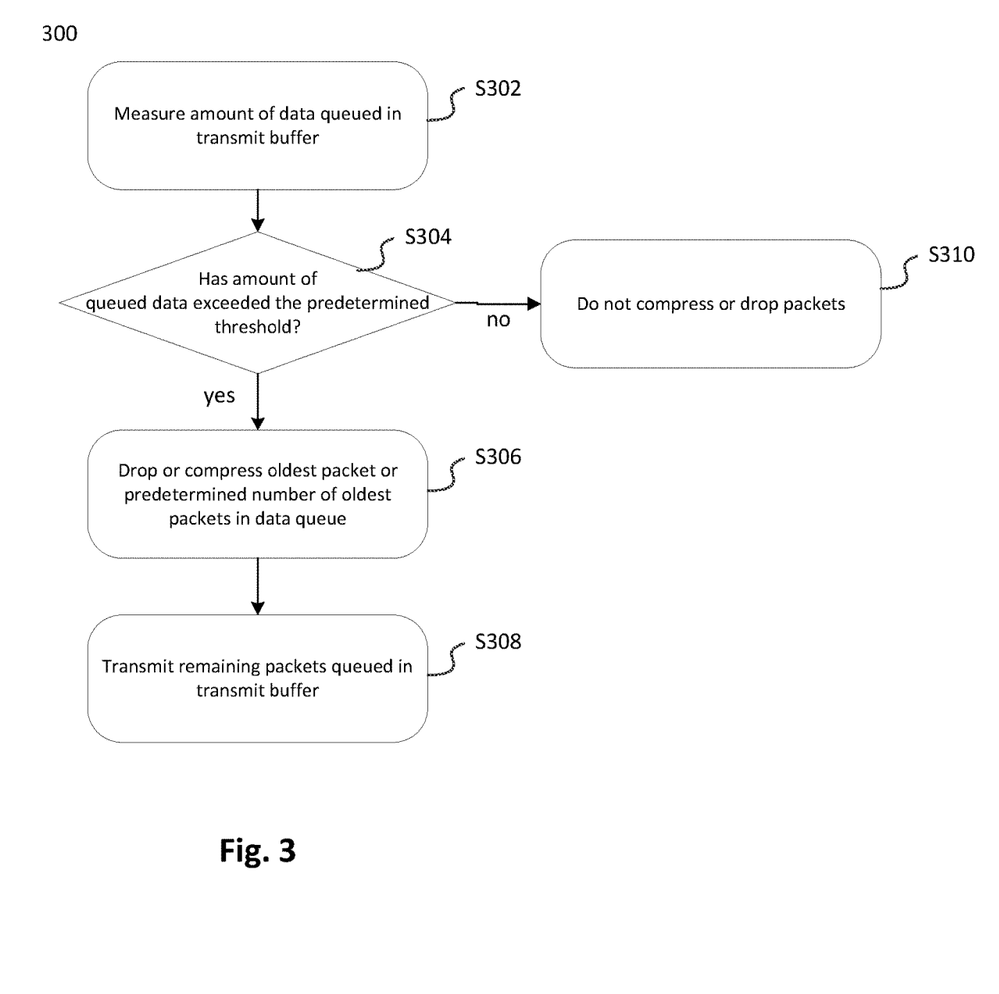
FIG. 3 shows a flow chart for a process of measuring an amount data buffered for transmission in the transmit buffer, and to drop or compress the oldest packet on condition the amount exceeds a predetermined threshold.

With reference to FIGS. 3 and 4 there is now described a method for reducing the amount of data queued for transmission in the transmit buffer by dropping or compressing the oldest packet or a predetermined number of the oldest packets in response to the amount of queued data exceeding a predetermined threshold.

FIG. 3 is a flow chart for a process 300 of measuring an amount data queued for transmission in the transmit buffer, and to drop or compress the oldest packet on condition the amount exceeds a predetermined threshold.

The process 300 starts at step S302 whereby controller 226 measures the amount of data buffered for transmission in the transmit buffer. This could be measured in total media stream time, total number of samples or frames, or total number of packets. The process then proceeds to step S304 where the controller determines whether the measured amount of buffered data exceeds a predetermined threshold. Such threshold being set dependent upon some determination of whether a number of the packets in the queue are likely to be seen by the receiver upon delivery as having been delayed. The process then proceeds to step S306, where if the answer to step S304 is no, and threshold has not been exceeded, no packets in the buffer will be dropped or compressed and the buffered packets for transmission will be transmitted. If the answer to the question at step S304 is yes, and the predetermined threshold has been exceeded (or is likely to be exceeded), the controller 226 is arranged to cause the dropping or compression of the oldest packet in the buffer or a predetermined number of the oldest packets in the buffer. The predetermined number of packets to drop may depend on a comparison between the time stamp of the oldest packet and the time stamp of the newest packet in the transmit buffer. The predetermined number may depend on information relating to current time and the time stamp of the oldest packet in the transmit buffer. The predetermined number may be based on historical information on delay between the time stamp of a data packet and the time of transmission of the same data packet. The predetermined number may be based on information on the duration of the last processing stall or any combination of the information mentioned hereto. The process 300 then moves onto step S308 where the remaining packets buffered for transmission within the transmit buffer are transmitted.

FIGS. 4a-d are a series of schematics illustrating the different delays perceived by the receiving further user terminal 110 due to various transmitter 104 and network 106 delays.

FIG. 4a-d shows three data packets labelled 1, 2 and 3. These three data packets illustrate a series of data packets comprising an amount of media stream data and its order. That is to say packet 1 contains the oldest piece of media data in the order and packet 3 contains the most recent piece of media data. The packets are presented in a simplified state and merely serve to represent the segmenting and distributing of captured media data in a transmitter-network-receiver system. The packets do not represent any particular type of data packet with an associated protocol layer or lack thereof. The order of the packets has been simplified to assist with explaining the overall concept and does not signify any order being maintained during buffering or transmission. Transmitting terminal 104 serves to capture the live media stream data, and packetize it for further transport and processing etc. Before being transmitted the packets are held in a transmit buffer 224a.

Figure 4A:
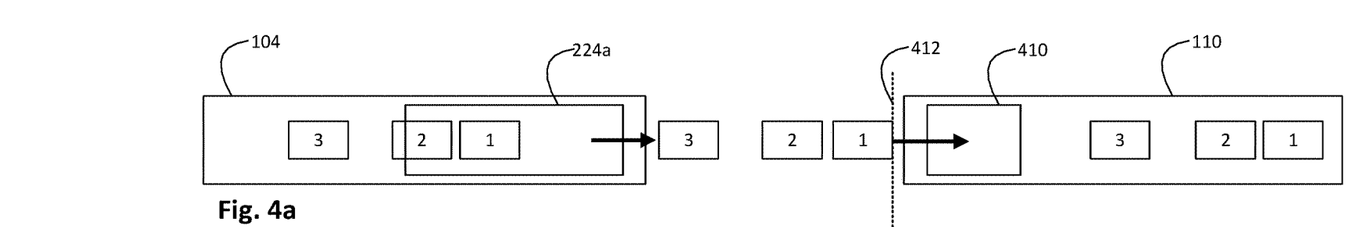
FIGS. 4*a-d* are a series of schematics illustrating the different delays perceived by a receiver due to various transmitter and network delays.

FIG. 4a shows packet 1 already being in the transmit buffer, packet 2 moving into the transmit buffer, and packet 3 having been formed and on its way to the transmit buffer. The order and spacing of these packets serves to represent their respective capture order and the relative time of capture with respect to each other. As such to play out the media correctly at the receive end the packets should be played out in such an order and with such a timing that the logical order of the media is conserved. FIG. 4a illustrates a perfect system, where the packets do not aggregate in the transmit buffer 224a in transmit terminal 104, the network 106 does not delay the packets nor subsequently group the packets more closely, and the receiving further user terminal 110 receives the packets in time for play out and in the same logical order with which they were captured. 410 represents the receive jitter buffer of the receiving terminal and its width from left to right represents its length in time or memory size. That is the amount of time the buffer will wait, or the amount of media stream data it can accommodate while waiting, for the receipt of delayed packets before giving up on receiving the packets in time for play out and instead concealing their absence. Dotted line 412 represents the 'on time' position of packet 1. This serves to illustrate that this media packet, and subsequent media packets, are not delayed.

Figure 4B:
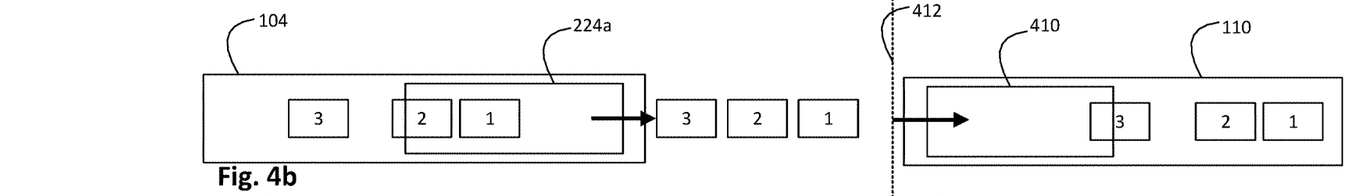

FIG. 4b shows a system where there is no transmit side delay in buffer 224a, but there is delay introduced by the network 106. Packets 1 and 2 have been delayed. This can be seen from the closer grouping of the packets and the smaller spacing between packets 2 and 3. Packets 1 and 2 are both further behind the dotted line 412, indicating that the receiving further user terminal 110 will see these packets as delayed. In the process of accommodating this delay and the playing out of packets 1, 2, and 3 in the logical order in which they were captured, the receive jitter buffer 410 of the receiving further user terminal 110 has been extended. This allows for packets 1, 2, and 3 to be played out correctly, but they are also delayed an extra amount due to this buffer adaption.

Figure 4C:
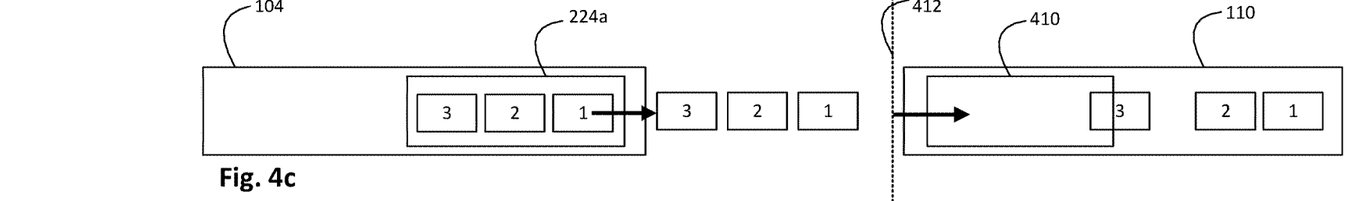

FIG. 4c shows a system where there is an aggregation of media stream data packets in the transmit buffer 224a of the transmitting terminal 104. This aggregation is due to some delay prior to the process of transmitting the packets. For example, the delay could be due to a CPU stall or processor thread stall. For the purposes of this example the network connection is of good quality and adds no delay. Consequently, the media packets are transmitted from the transmit terminal with delay, but the receiver perceives the delay without knowing the cause and behaves in the same way as it did in FIG. 4b in response to the network caused delay. As a result, the receive jitter buffer 410 is extended as in FIG. 4c, and extra delay is introduced to the media stream in order to account for waiting for the delayed packets.

Figure 4D:
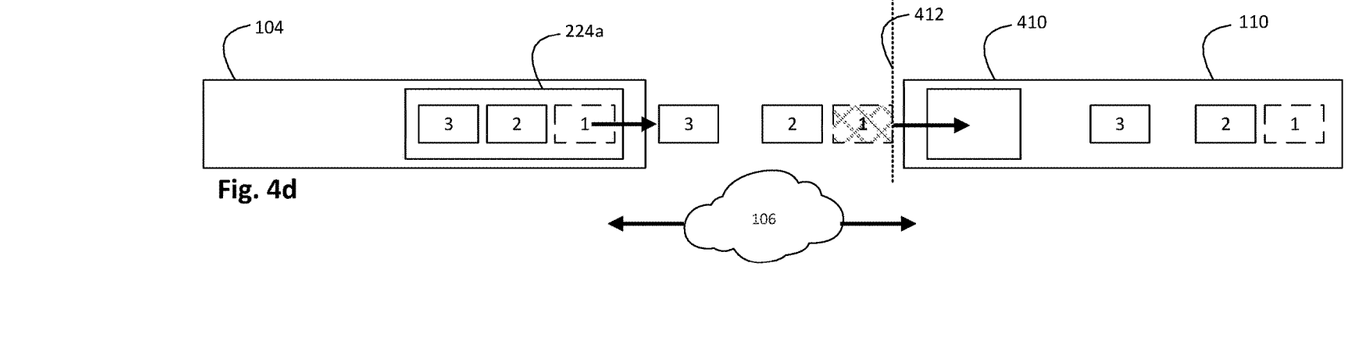

FIG. 4d shows how the type of transmit buffer aggregation delay of FIG. 4c can be detected prior to the transmitting of the packets, and actions taken in response to detecting the buildup can be taken so as to trick the receive terminal into seeing a lost packet 1 instead of a delayed packet 1. Media stream packets 1, 2, and 3 aggregate in the transmit buffer 224a. In response to measuring that the amount of data buffered for transmission exceeds a predetermined threshold packet 1 is either dropped or compressed. For example, packet 1 here is shown having a dotted line. If the loss of this packet is accepted at the transmitting terminal and the packet is dropped packet 2 can be transmitted with no delay. The FIG. shows how by dropping packet 1, and transmitting packet 2 without delay, the packet arrives at the dotted time line 412 at the same position as the packet 2 of FIG. 4a which experiences no delay. The receiver detects that there is no delay in the transmission, and the receive jitter buffer 410 remains the same size. Thus no extra delay is introduced in the situation where the delay is introduced into the system before the transmission of the packets, and is thus detectable and compensated for prior to the transmission of any packets. Packet 1 is represented by a hashed box when in the network as at this time it appears as though it has been dropped. However, in reality the packets 1 and 2 maybe have been compressed at the transmit side in such a way that the media stream data of packets 1 and 2 is contained within the transmitted packet 2. Therefore, packet 1 represented by a dotted line in the receiver could be either a missing packet or media stream data delivered on time in packet 2, but comprising information of packet 1, which can then be subsequently played out. The end result of not extending the receive/jitter buffer 410 is still achieved as packet 2 appears to the receiving terminal to have arrived on time with no delay.

Another way of describing the idea is as follows.

Suppose the transmitter has an amount of data totaling N packets not yet sent.

Send side: $[A_{1,0}, \ldots, A_{N,0}]$, where $A_{i,j}$ denotes a packet of the media stream at packetization time i observed at time j.

The network may impose a delay of M packetization times to transmitted packets such that the receiver side has: $[A_{1,M} \ldots A_{N,M}]$ If the transmitter trims the number of packets, either by dropping X packets, or compressing the data into the equivalent of N-X packets, the send side has the following, where a new transmission B results from a resampling or time-compression.

Send side: $[A_{X+1,0} \ldots A_{N,0}]$ or

Send side: $[B_{X+1,0} \ldots B_{N,0}]$

Which will be seen by the receiver side as:

1. $[A_{X+1,M} \ldots A_{N,M}]$ or $[B_{X+1,M} \ldots B_{N,M}]$ respectively.

The order of the packets in the media stream is the logical order. For example, the logical order of the packets given the packets contain an audio signal comprising speech would be such that when the packets are in order the correspondingly ordered audio data conveys the audio signal comprising the speech. When the live media stream is captured live the order is the same order of capture of the live stream. Where the packets have a time stamp and/or sequence number the order can be signified and thus determined using the time stamp and/or sequence number of the packets. RTP protocol for example contains both of these values within its packet header. Other protocols may only comprise a time stamp or may only comprise a sequence number. As such the data packets when received at the receiving terminal can be placed in the correct order such that any media data contained within is played out in the logical order. The time stamp and/or sequence number thus provide an indication of which packets buffered in the buffer contain the oldest media stream data.

The media data type of the live media stream can be any of audio data, video data, or game data. More specifically the live data could be call data. The call data being data corresponding to a communication transmitted over a network. The network may be a network like the Internet. The call may be a Voice Over Internet Protocol or VOIP call. The call data may be the data of a video call.

Packets may be dropped based on an indication of the content they contain. For example, a packet may contain a portion of silence or video which is visually still or blank. Such packets may be dropped in preference to packets containing audible sounds, non-blank video or moving video data. This is performed in combination with compression. As such it continues to appear to the receiver as though the oldest packets have been dropped or lost instead of delayed.

Information may be known about the certain type of receiver which will be receiving the transmitted packets. For example, information may be known about behavior concerning the adaptation of the jitter buffer of the receiving terminal. Such feedback information and indications thereto can be used to set the predetermined threshold which is exceeded or likely to be exceeded. Whether the amount of data buffered in the buffer is measured may depend on the known type of receiver. For example, a receiver which adapts its jitter buffer quickly in response to a temporary spike in delay, and quickly back afterwards, may not significantly benefit from the dropping or compressing of packets, and the technique may there not be performed. However, should it be determined that if the receiver slowly adapts its jitter buffer in response to a temporary spike in delay then the technique may significantly improve the experience of the communication by minimizing the adaptation in these circumstances. It may be that no information is available to the transmitter about the receiver.

It is possible to infer from measuring the amount of data buffered in another further buffer within the transmitting user terminal that the amount of packets buffered in the transmit buffer is likely to exceed the predetermined threshold upon the packets reaching the transmit buffer. Alternatively, there could be a separate predetermined threshold associated with the particular further buffer. For example, a capture buffer of the transmit terminal used for capturing a live media stream may fill above a predetermined threshold during a thread stall or CPU stall. Upon the thread being ready to run again the transmit buffer may be filled to a greater extend by the data packets which accumulated in the capture buffer. The other buffer may be any type of buffer where data is stored prior to its processing into packets for transmission and buffering in the transmit buffer.

In some embodiments the controller may only instigate the dropping or compressing of packets when there is an indication of a CPU stall. Particularly a stall of the CPU used to process the packets for transmission from the transmitter.

In some embodiments the controller may only instigate the dropping or compressing of packets when the network conditions are determined to be good. That is to say if the network conditions for the transmission over the network exceed a predetermined transmission quality. If network conditions are perceived as bad or below a certain quality level, significant delay introduced by the network after the packets are transmitted could negate the benefit of the dropping of the queued packets. Thus the transmit side may only drop or compress data packets queued for transmission when the network condition is good. In such good network conditions, the process is thus more likely to significantly impact the observed delay of the data packets. The predetermined transmission quality may be a measure of the latency of the network. The transmission quality may also be determined from a RTCP control protocol. The predetermined transmission quality could also be determined based on a measure of packet loss or a measure of jitter. A combination of any of the network transmission quality measures mentioned herein could provide a sufficient indication as to whether the network conditions exceed a predetermined transmission quality. For example, packet loss could be relevant as if it is high the further dropping of packets could negate the benefit of the dropping of the queued packets. Jitter measured in the network could also be indicative of a strained channel.

Distribution of jitter for some time window can be considered, and if a transient lag spike due to send side stalling as an outlier is observed, then the benefit of the method described herein depends on whether the jitter buffer's estimation of the distribution of jitter is sensitive to such outliers. Such spikes can occur due to router queues and/or Wi-Fi spikes etc. The jitter buffer may or may not be design to incorporate these spikes or to classify and disregard those observations of jitter. The statistics of the jitter may be tracked in different ways, for instance minimum, maximum, mean, a history buffer, or through histograms. Precedence may be given to newer data through time windows and/or moving averages etc.

It should be understood that although embodiments herein are described predominantly in relation to audio data, the method and apparatus described herein relates equally to any type of media data capable of aggregating at the transmit buffer as a result of an internal processing delay, such as a CPU or thread stall, whilst carrying out any processing relating to that media data. For example, the aggregation of video data in a video capture buffer, resulting in the aggregation of that video data in the transmit buffer. In another example the aggregation of game data in a media data buffer subsequently resulting in the aggregation of that game data in the transmit buffer.

It will be appreciated that the above embodiments have been described by way of example only. More generally, according to one aspect disclosed herein there is provided a transmitting device comprising a transmit buffer for buffering a plurality of packets representing a live media stream, the packets having an order in the media stream from oldest to most recent. A transmitter for transmitting the packets from the buffer live over a network. A controller arranged to measure an amount of data buffered for transmission in the transmit buffer, and to drop or compress the oldest packet or a predetermined number of the oldest packets on condition that said amount of data buffered for transmission exceeds or is likely to exceed a predetermined threshold.

The transmitting device may further comprise the controller being configured to drop or compress one or more further packets selected based on an indication of the content of the further packets.

The transmitting device may further comprise the indication of the content being an indication that a packet represents a silent or visually blank portion of the live media stream.

The transmitting device may further comprise the controller being configured to detect said condition that the amount of data buffered for transmission exceeds the predetermined threshold based on: measuring the amount of data buffered for transmission in the buffer.

The transmitting device may further comprise the controller being configured to infer said condition that the amount of data buffered for transmission is likely to exceed the predetermined threshold based on: receiving an indication of a CPU stall of a CPU used to process the packets for transmission from said transmitter.

The transmitting device may further comprise the controller being configured to perform said dropping or compressing on further condition that network conditions for the transmission over said network exceed a predetermined transmission quality.

The transmitting device may further comprise said predetermined transmission quality comprising a predetermined network latency.

The transmitting device may further comprise the controller being configured to infer said condition that the amount of data buffered for transmission is likely to exceed the predetermined threshold based on: receiving an indication of a behaviour of a receiver of the plurality of packets representing the live media stream.

The transmitting device may further comprise the indication of the behaviour of the receiver indicating a type of the jitter buffer from amongst a plurality of possible types comprising a jitter buffer which adapts more slowly, and a jitter buffer which adapts more quickly, wherein the controller is configured to infer said condition that the amount of data buffered for transmission is likely to exceed the predetermined threshold based on the indicated type.

The transmitting device may further comprise the controller being configured to infer said condition that the amount of data buffered for transmission is likely to exceed the predetermined threshold based on: an indication that a further buffer used in the processing of the live media stream contains an amount of data buffered that exceeds an associated predetermined threshold.

The transmitting device may further comprise the media of the live media stream being audio, and/or video, and/or game data.

The transmitting device may further comprise the audio and/or video data being call data and/or TV broadcast data.

The transmitting device may further comprise the live media stream being captured live, and said order is the same as the order of capture.

The transmitting device may further comprise each of the packets having a timestamp, and the order of the packets is determined based on this timestamp.

In an embodiment a method comprising buffering, at a transmit buffer, a plurality of packets representing a live media stream, the packets having an order in the media stream from oldest to most recent. Detecting an amount of data buffered for transmission in the transmit buffer. Dropping or compressing the oldest packet or a predetermined number of the oldest packets on condition that said amount of data buffered for transmission exceeds a predetermined threshold, and transmitting the remaining packets from the buffer live over a network.

The method may further comprise the dropping or compressing comprises dropping or compressing one or more further packets selected based on an indication of the content of the further packets.

The method may further comprise the detecting of said condition that the amount of data buffered for transmission exceeds the predetermined threshold being based on: measuring the amount of data buffered for transmission in the buffer.

The method may further comprise the detecting of said condition that the amount of data buffered for transmission exceeds the predetermined threshold being based on: receiving an indication of a CPU stall of a CPU used to process the packets for transmission from said transmitter.

The method may further comprise the dropping or compressing comprising dropping or compressing on the further condition that network conditions for the transmission over said network exceed a predetermined transmission quality.

In an embodiment a computer program product comprising code embedded on computer-readable storage and configured so as when run on said user terminal to perform the method of any proceeding statement.

Generally, any of the functions described herein (e.g. the functional modules shown in FIG. 2 and the functional steps shown in FIG. 3) can be implemented using software, firmware, hardware (e.g., fixed logic circuitry), or a combination of these implementations. The modules and steps shown separately in FIGS. 2 and 3 may or may not be implemented as separate modules or steps. The terms "module," "functionality," and "component" as used herein generally represent software, firmware, hardware, or a combination thereof. In the case of a software implementation, the module, or functionality represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors. For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A transmitting device comprising:
   a transmit buffer for buffering a plurality of packets representing a live media stream, the packets having an order in the media stream from oldest to most recent;
   a transmitter for transmitting the packets from the buffer live over a network; and
   a controller arranged to measure an amount of data buffered for transmission in the transmit buffer, and to drop or compress a predetermined number of the oldest packets on condition that said amount of data buffered for transmission exceeds a predetermined threshold, wherein the predetermined number of the oldest packets is based on a duration of a processing stall of a processor.

2. The transmitting device of claim 1, wherein the controller is configured to drop or compress one or more further packets selected based on an indication of the content of the further packets.

3. The transmitting device of claim 2, where the indication of the content is an indication that a packet represents a silent or visually blank portion of the live media stream.

4. The transmitting device of claim 1, wherein the controller is configured to detect said condition that the amount of data buffered for transmission exceeds the predetermined threshold based on measuring the amount of data buffered for transmission in the buffer.

5. The transmitting device of claim 1, wherein the controller is configured to infer said condition that the amount of data buffered for transmission exceeds the predetermined threshold based on receiving an indication of a processing stall of the processor used to process the packets for transmission from said transmitter.

6. The transmitting device of claim 1, wherein the controller is configured to perform said dropping or compressing on further condition that network conditions for the transmission over said network exceed a predetermined transmission quality.

7. The transmitting device of claim 6, wherein said predetermined transmission quality comprises a predetermined network latency.

8. The transmitting device of claim 1, wherein the controller is configured to infer said condition that the amount of data buffered for transmission exceeds the predetermined threshold based on receiving an indication of a behaviour of a receiver of the plurality of packets representing the live media stream.

9. The transmitting device of claim 1, wherein the controller is configured to infer said condition that the amount of data buffered for transmission exceeds the predetermined threshold based on an indication that a further buffer used in the processing of the live media stream contains an amount of data buffered that exceeds an associated predetermined threshold.

10. The transmitting device of claim 1, wherein the media of the live media stream is audio, and/or video, and/or game data.

11. The transmitting device of claim 10, wherein the audio and/or video data is call data and/or TV broadcast data.

12. The transmitting device of claim 1, wherein the live media stream is captured live, and said order is the same as the order of capture.

13. The transmitting device of claim 1, where each of the packets has a timestamp, and the order of the packets is determined based on this time stamp.

14. A method comprising:
buffering, at a transmit buffer, a plurality of packets representing a live media stream, the packets having an order in the media stream from oldest to most recent;
detecting, by a controller, an amount of data buffered for transmission in the transmit buffer;
dropping or compressing a predetermined number of the oldest packets on condition that said amount of data buffered for transmission exceeds a predetermined threshold, wherein the predetermined number of the oldest packets is based on a duration of a processing stall of a processor; and
transmitting the remaining packets from the buffer live over a network.

15. The method of claim 14, wherein the dropping or compressing comprises dropping or compressing one or more further packets selected based on an indication of the content of the further packets.

16. The method of claim 14, wherein the detecting of said condition that the amount of data buffered for transmission exceeds the predetermined threshold is based on measuring the amount of data buffered for transmission in the buffer.

17. The method of claim 14, wherein the detecting of said condition that the amount of data buffered for transmission exceeds the predetermined threshold is based on receiving an indication of processing stall of the processor used to process the packets for transmission from said transmitter.

18. The method of claim 14, wherein the dropping or compressing comprises dropping or compressing on the further condition that network conditions for the transmission over said network exceed a predetermined transmission quality.

19. A computer program product comprising code embedded on computer-readable storage and configured so as when run on a user terminal to perform a method comprising:
buffering, at a transmit buffer, a plurality of packets representing a live media stream, the packets having an order in the media stream from oldest to most recent;
detecting, by a controller, an amount of data buffered for transmission in the transmit buffer;
dropping or compressing a predetermined number of the oldest packets on condition that said amount of data buffered for transmission exceeds a predetermined threshold, wherein the predetermined number of the oldest packets is based on a duration of a processing stall of a processor; and
transmitting the remaining packets from the buffer live over a network.

\* \* \* \* \*